US011913259B2

(12) United States Patent
van Bebber et al.

(10) Patent No.: US 11,913,259 B2
(45) Date of Patent: Feb. 27, 2024

(54) CLOSING ASSEMBLY FOR MOTOR VEHICLE

(71) Applicant: Ford Global Technologies, LLC, Dearborn, MI (US)

(72) Inventors: David van Bebber, Aachen (DE); Jacco Poleij, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 487 days.

(21) Appl. No.: 16/683,318

(22) Filed: Nov. 14, 2019

(65) Prior Publication Data

US 2020/0157857 A1 May 21, 2020

(30) Foreign Application Priority Data

Nov. 15, 2018 (DE) ......................... 102018219571.4

(51) Int. Cl.
*E05B 77/38* (2014.01)
*E05B 85/20* (2014.01)

(52) U.S. Cl.
CPC .............. *E05B 77/38* (2013.01); *E05B 85/20* (2013.01)

(58) Field of Classification Search
CPC ........ E05C 5/00; E05C 2005/005; E05F 5/02; E05F 5/022; E05F 5/025; E05F 5/027;
(Continued)

(56) References Cited

U.S. PATENT DOCUMENTS 3,848,911 A 11/1974 Watermann et al.
5,138,743 A 8/1992 Hoffman
(Continued)

FOREIGN PATENT DOCUMENTS

DE 1131119 B * 6/1962 ......... E05B 15/0295
DE 102011115419 A1 * 4/2013 .............. E05F 5/003
(Continued)

OTHER PUBLICATIONS

English Translation for JP 2008163704 A (Year: 2021).*
(Continued)

*Primary Examiner* — Alyson M Merlino
(74) *Attorney, Agent, or Firm* — Vichit Chea; Carlson, Gaskey & Olds, P.C.

(57) ABSTRACT

This disclosure relates to a closing assembly for a motor vehicle, and more particularly to a closing assembly for body closures of motor vehicles. An example vehicle includes an immovable body component, a moveable body component configured to move relative to the immovable body component, and a closing assembly. The closing assembly includes a locking bolt configured to engage a latch moveable relative to a guide slot between a release position and a closed position. The closing assembly further includes a spring exerting a restoring force urging the latch in the direction of the closed position. The restoring force has no force component along a section of the guide slot corresponding to the release position of the latch. The closing assembly is a low cost and robust assembly which reduces noise associated with closing a vehicle door. These and other benefits will be appreciated from the following description.

16 Claims, 8 Drawing Sheets

(58) Field of Classification Search

CPC ... E05F 1/08; E05F 1/10; E05F 1/1041; E05F 1/105; E05F 1/1058; E05F 1/1066; E05F 1/1075; E05F 1/1091; E05F 1/14; E05F 5/003; E05B 77/36; E05B 77/38; E05B 77/42; E05B 85/20; E05B 85/243; E05D 2015/1026; Y10T 292/0886; Y10T 292/0887; Y10T 292/0889; Y10T 292/089; Y10T 292/0891; Y10T 292/0892; Y10T 292/0893

See application file for complete search history.

(56) References Cited

U.S. PATENT DOCUMENTS

| | | | | |
|---|---|---|---|---|
| 5,522,656 | A | 6/1996 | Jenkins | |
| 2001/0008037 | A1* | 7/2001 | Brustle | E05F 5/027 16/71 |
| 2004/0237252 | A1* | 12/2004 | Hoshide | E05F 5/003 16/72 |
| 2009/0273129 | A1* | 11/2009 | Zimmer | E05F 5/003 267/170 |
| 2010/0314889 | A1* | 12/2010 | Wang | E05C 5/00 292/97 |
| 2011/0210653 | A1* | 9/2011 | Salice | A47B 88/47 312/319.1 |
| 2014/0109343 | A1* | 4/2014 | Chang | E05F 5/003 16/49 |
| 2020/0217120 | A1* | 7/2020 | Kozlovic | E05F 5/027 |

FOREIGN PATENT DOCUMENTS

| | | | | | |
|---|---|---|---|---|---|
| JP | 11229705 | A | * | 8/1999 | E05F 5/003 |
| JP | 2006063767 | A | * | 3/2006 | E05F 1/16 |
| JP | 2007120619 | A | * | 5/2007 | E05F 5/02 |
| JP | 2008163704 | A | * | 7/2008 | |
| KR | 20060134042 | A | * | 12/2006 | E05F 5/003 |
| KR | 101055107 | B1 | * | 8/2011 | E05F 5/027 |
| WO | WO-2012144529 | A1 | * | 10/2012 | E05F 5/027 |
| WO | WO-2019117828 | A2 | * | 6/2019 | E05F 5/00 |

OTHER PUBLICATIONS

English Translation for JP 2006063767 A (Year: 2021).*

Computer Generated Translation for JP 11229705 A, Generated on May 22, 2023, https://worldwide.espacenet.com/ (Year: 2023).*

* cited by examiner

CLOSING ASSEMBLY FOR MOTOR VEHICLE

RELATED APPLICATION(S)

This application claims priority to German Patent Application No. 102018219571.4, filed on Nov. 15, 2018, the entirety of which is herein incorporated by reference.

TECHNICAL FIELD

This disclosure relates to a closing assembly for a motor vehicle, and more particularly to a closing assembly for body closures (e.g., doors, trunks) of motor vehicles.

BACKGROUND

Motor vehicles are known to include doors which, when closed, can produce a noise. When vehicle doors are slammed shut, for example, the noise can be significant and, in the case of electrified vehicles, the noise can be the loudest noise produced by the vehicle.

SUMMARY

A motor vehicle according to an exemplary aspect of the present disclosure includes, among other things, an immovable body component, a moveable body component configured to move relative to the immovable body component, and a closing assembly. The closing assembly includes a locking bolt configured to engage a latch moveable relative to a guide slot between a release position and a closed position. The closing assembly further includes a spring exerting a restoring force urging the latch in the direction of the closed position. The restoring force has no force component along a section of the guide slot corresponding to the release position of the latch.

In a further non-limiting embodiment of the foregoing motor vehicle, the closing assembly includes a closing unit including the latch, guide slot, and spring, and the closing unit is mounted to one of the moveable body component and the immovable body component.

In a further non-limiting embodiment of any of the foregoing motor vehicles, the closing unit further includes comprises at least one damping unit connected to the latch.

In a further non-limiting embodiment of any of the foregoing motor vehicles, the at least one damping unit is configured to apply a variable damping force to the latch.

In a further non-limiting embodiment of any of the foregoing motor vehicles, the closing assembly includes a closing element including the locking bolt, and the closing element is mounted to the other of the moveable body component and the immovable body component.

In a further non-limiting embodiment of any of the foregoing motor vehicles, the guide slot is substantially L-shaped and includes a closing section extending substantially parallel to the restoring force of the spring and a release section extending normal to the restoring force of the spring.

In a further non-limiting embodiment of any of the foregoing motor vehicles, the latch includes two guide pins configured to slide within the guide slot, and the restoring force urges the latch to the closed position when at least one of the guide pins is in the closing section of the guide slot.

In a further non-limiting embodiment of any of the foregoing motor vehicles, when the latch is in the release position, the guide pins are both in the release section of the guide slot.

In a further non-limiting embodiment of any of the foregoing motor vehicles, the guide pins are spaced-apart from one another and extend parallel to one another.

In a further non-limiting embodiment of any of the foregoing motor vehicles, the spring is a tension spring.

In a further non-limiting embodiment of any of the foregoing motor vehicles, the closing assembly includes a closing unit including the latch, guide slot, and spring, and the closing unit is mounted to a B pillar of the motor vehicle.

In a further non-limiting embodiment of any of the foregoing motor vehicles, the closing assembly includes a closing element including the locking bolt and a support arm hinged to the moveable body component.

In a further non-limiting embodiment of any of the foregoing motor vehicles, the locking bolt is arranged adjacent a free end of the support arm.

In a further non-limiting embodiment of any of the foregoing motor vehicles, the vehicle includes at least one swivel unit configured to swivel the support arm between a functional position projecting out from the movable body component to a resting position.

In a further non-limiting embodiment of any of the foregoing motor vehicles, the moveable body component is a body closure.

A closing assembly for a motor vehicle according to an exemplary aspect of the present disclosure includes a guide slot, a latch moveable relative to the guide slot between a release position and a closed position, a locking bolt configured to engage the latch, and a spring exerting a restoring force urging the latch in the direction of the closed position. Further, the restoring force has no force component along a section of the guide slot corresponding to the release position of the latch.

In a further non-limiting embodiment of the foregoing closing assembly, the guide slot is substantially L-shaped and includes a closing section extending substantially parallel to the restoring force of the spring and a release section extending normal to the restoring force of the spring.

In a further non-limiting embodiment of any of the foregoing closing assemblies, the latch includes two guide pins configured to slide within the guide slot, and the restoring force urges the latch to the closed position when at least one of the guide pins is in the closing section of the guide slot.

In a further non-limiting embodiment of any of the foregoing closing assemblies, when the latch is in the release position, the guide pins are both in the release section of the guide slot.

DETAILED DESCRIPTION

Figure 1:
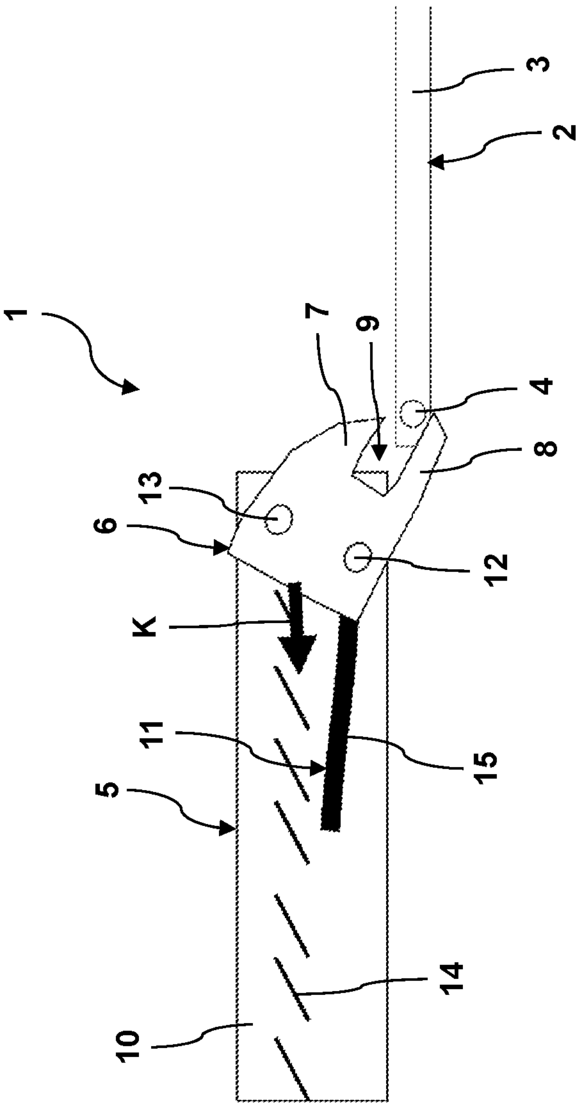
FIG. 1 is a schematic representation of an exemplary embodiment of a closing assembly according to the disclosure in a release state.

This disclosure relates to a closing assembly for a motor vehicle, and more particularly to a closing assembly for body closures of motor vehicles. An example vehicle includes an immovable body component, a moveable body component configured to move relative to the immovable body component, and a closing assembly. The closing assembly includes a locking bolt configured to engage a latch moveable relative to a guide slot between a release position and a closed position. The closing assembly further includes a spring exerting a restoring force urging the latch in the direction of the closed position. The restoring force has no force component along a section of the guide slot corresponding to the release position of the latch. The closing assembly is a low cost and robust assembly which reduces noise associated with closing a vehicle door. These and other benefits will be appreciated from the following description.

This disclosure provides a closing assembly with a closing unit, which has at least one guide unit with at least one curved guide slot, on which a rotary latch can move in forced guidance by two guide pins which are spaced apart from one another and fastened to the rotary latch. The pins extend parallel to one another and engage the guide slot between a release position and a closed position. The closing unit furthermore comprises at least one spring element with which force is applied to the rotary latch in the direction of the closed position. A restoring force generated by the spring element and acting on the rotary latch in the release position has no force component along a guiding section of the guide slot that is associated with the release position of the rotary latch.

In one aspect of this disclosure, mechanical components are used for a closing process by which the movable body component, such as a body closure (i.e., a vehicle door or a trunk flap, or liftgate), is moved from an open position to a closed position and held in this position. Thus, no electronic components are used. In this way, the closing assembly according to this disclosure can be produced more cost effectively, and furthermore it does not increase the energy consumption of a motor vehicle by the consuming of electrical energy.

In a further aspect of this disclosure, the closing assembly enables an automated, slow, and quiet closing of the movable body component from the condition in which the locking bolt is engaged with the rotary latch. This makes it possible to reduce the noise production, which has particular benefits in cities and their urban residents. Animals also benefit from reduced noise.

In operation, when the movable body component is closed, the body component at first is moved manually in the direction of its closed position until the locking bolt engages with the rotary latch. Due to the contact of the locking bolt with the rotary latch, the latter is forced out from its release position. The rotary latch is pushed along the guide unit or the curved guide slot and at the same time rotated, whereupon the rotary latch engages with the locking bolt during its rotation. This rotation of the rotary latch is created by the curvature of the guide slot and by the guiding of the rotary latch by means of the two guide pins on the guide slot.

Further, once the rotary latch has been forced out from the release position by a certain amount, the two guide pins find themselves at a curve of the guide slot, which is adjacent to the guiding section of the guide slot associated with the release position of the rotary latch at the closed position side and oriented such that the restoring force generated by the spring element and acting on the rotary latch situated at the curve has a force component along the curve in the direction of the closed position of the rotary latch. In this way, the spring element can exert a force on the rotary latch, which has been forced out from its release position, by which the rotary latch is automatically pushed or pulled in the direction of its closed position. Once the rotary latch has reached its closed position in this way, the movable body component finds itself in its closed position. The spring force of the spring element is sufficient to hold the movable body component in the closed position.

When the movable body component is moved out from its closed position, the rotary latch is moved out from its closed position by the locking bolt engaging with it under the tension of the spring element and moved along the guide slot until the rotary latch has reached its release position. In this process, at least one guide pin passes the aforementioned curve of the guide slot, such that the rotary latch is rotated and in this way releases the locking bolt. Thanks to the tension of the spring element and the tensioning of the spring element when the rotary latch is in its release position, the spring element can again exert a force on the rotary latch during the next closing process.

The closing element with the locking bolt may be fastened on the movable body component and the closing unit may be fastened on the immovable body component. Alternatively, the closing element with the locking bolt may be fastened on the immovable body component and the closing unit may be fastened on the movable body component.

The closing element may comprise a fastening plate which can be fastened on the respective body component and a support arm holding the locking bolt. The length of the support arm may be attuned to the shape or length of the guide slot. The closing element can be made partly or entirely of a metal or a metal alloy.

The rotary latch is preferably designed as a fork latch. Preferably, the rotary latch is arranged in its release position such that one lever arm of the rotary latch, with which the locking bolt at first comes into contact during a closing process of the movable body component, is situated at an incline to a preferably linear motion path of the locking bolt along the guide unit and engages with this motion path of the locking bolt. This makes it easier to move the rotary latch by means of the locking bolt out from its closed position. The rotary latch preferably has a further lever arm, which engages with the motion path of the locking bolt when the rotary latch is in its closed position and in this way arrests the locking bolt.

The guide pins fastened on the rotary latch may be fabricated separately from the rotary latch and components connected to the rotary latch or monolithically with the rotary latch. The spaced apart guide pins compel the rotary latch to rotate during a movement of the rotary latch along the guide slot. The guide pins are preferably connected in captive manner to the guide unit or engage in captive manner with the guide slot. The restoring force generated with the spring element is preferably channeled into that region of the rotary latch in which the leading guide pin is situated during a movement of the rotary latch into the release position.

The spring element may be configured in any given manner so as to be elastically deflected and to thereby generate a sufficient restoring force. The closing unit may also comprise two or more spring elements connected in series or in parallel. The spring element may be connected directly or indirectly to the rotary latch.

According to one embodiment, the guide slot is substantially L-shaped and has a closing section running parallel to the direction of the restoring force, which passes by a curve of the guide slot into the guiding section of the guide slot associated with the release position of the rotary latch. When the rotary latch is in its closed position, at least the leading guide pin during a movement of the rotary latch into the release position is situated on the guiding section of the guide slot associated with the release position of the rotary latch. The other guide pin may be situated on the curve or the curved section of the guide slot. A guiding section of the guide slot adjacent to the curve of the guide slot in the direction of the closed position of the rotary latch may have a straight configuration.

In another embodiment, the closing unit includes at least one flexible traction component, by which the spring element is connected to the rotary latch, and at least one deflecting element for deflecting the traction component. In this way, the closing unit may be more compact in configuration, since a design depth of the closing unit becomes more independent of a size of the spring element. The deflecting element, such as a deflection roller, can deflect the flexible traction component for example by 90° upward or downward, whereupon the spring element will extend accordingly upward or downward.

According to another embodiment, the closing unit comprises at least one fluid dynamic damping unit connected to the rotary latch. The use of the damping unit enables a cushioning or a deliberate slowing down of the closing movement of the movable body component, making possible an especially quiet closing process. The damping unit may be hydraulic or pneumatic in design. The damping unit may be flexible and/or movable. The use of the damping unit is especially advantageous when a friction of the guide unit is not enough to cushion the closing movement of the movable body component. The damping force of the damping unit may be variable, so that the damping force is large close to the closed position of the rotary latch or when the damping unit is almost retracted, so that the movable body component moves more slowly and slowly reaches its closed position. When the damping unit is more extended, the damping force of the damping unit is less, so that the speed of movement of the movable body component during a closing process is at first only slowly reduced. A hydraulic damping unit for example may have at least one check valve in order not to impede the effect of the damping unit during an opening process of the movable body component.

According to another embodiment, the spring element comprises at least one tension spring. The tension spring may be configured for example as a helical spring.

In another aspect of this disclosure, a motor vehicle includes at least one closing assembly connected to the body components according to one of the aforementioned embodiments or a combination of at least two of these embodiments. Specifically, the benefits mentioned above in regard to the closing assembly are associated accordingly with a motor vehicle. The movable body component(s) may be a vehicle door, a trunk door, a liftgate, etc.

According to an aspect of this disclosure, the closing unit is fastened to a B pillar of the motor vehicle or an upper or lower section of a vehicle frame. The attachment of the closing unit in the region of the B pillar to an immovable body component enables a more expansive design of the closing unit, so that for example no flexible traction means as described above is needed between the rotary latch and the spring element. The mounting of the closing unit on or in the B pillar requires a compact design of the closing unit, which can be realized for example by the use of the above described flexible traction means with deflecting element. That said, it is within the scope of this disclosure to employ the closing assembly on any opening and closing elements, such as rear doors, the trunk compartment, liftgates, or tailgates, as examples. In other words, this disclosure is not limited to use relative to a B pillar.

In another embodiment, the closing element includes a support arm hinged to the movable body component, on which a free end segment the locking bolt is arranged. In this way, the support arm can be folded up when the movable body component is in an open position, so as not to stand out in obtrusive manner from the movable body component. The support arm is unfolded once more during a closing process of the movable body component in order to be able to guide the locking bolt along the guide unit. The support arm can fold up and unfold manually, for example.

In another embodiment, the motor vehicle comprises at least one swivel unit for the automatic swiveling of the support arm between a functional position projecting out from the movable body component to a resting position not projecting out from the movable body component, and vice versa. The swivel unit may be electromechanical or mechanical in design. The swivel unit may be designed to swivel the support arm depending on an opening angle of the movable body component.

According to another embodiment, the closing assembly is integrated in a lock associated with the movable body component or is arranged separate from the lock. In the latter case, the closing assembly and the lock may be operated and positioned independently of one another. In the first case, a single compact subassembly can be created, which can be arranged in space-saving manner.

In the different figures, the same parts are always given the same reference numbers, so, in general, these parts will only be described once.

FIG. 1 shows a schematic representation of an exemplary embodiment of a closing assembly 1 according to the disclosure for a motor vehicle, not shown, in a release state.

The closing assembly 1 comprises a closing element 2 which can be fastened to a movable body component, not shown, or to an immovable body component, not shown, and having a support arm 3 which can be fastened to the body component and a locking bolt 4 arranged on a free end section of the support arm 3.

Figure 2:
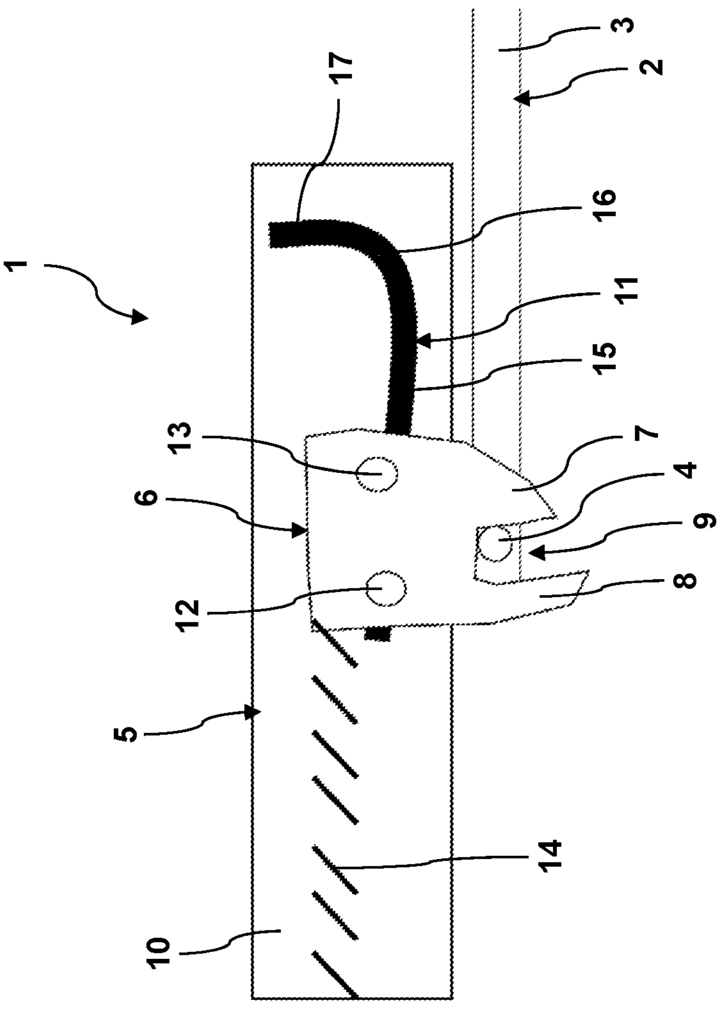
FIG. 2 is a schematic representation of the closing assembly shown in FIG. 1 in a closed state.

Moreover, the closing assembly 1 comprises a closing unit 5 which can be fastened to the immovable body component or the movable body component and having a rotary latch 6, with which the locking bolt 4 can engage, as shown in FIG. 2. The rotary latch 6 is designed as a fork latch in this example, and comprises two lever arms 7 and 8 spaced apart from one another, and between which a bolt gap 9 is situated to receive the locking bolt 4.

The closing unit 5 further comprises a guide unit 10 with a curved guide slot 11, on which the rotary latch 6 can move in forced guidance by two guide pins 12 and 13 which are spaced apart from one another and fastened to the rotary latch 6, extending parallel to one another and engaging in the guide slot 11, between a release position shown in FIG. 1 and a closed position shown in FIG. 2, in which the rotary latch 6 takes up a different rotary position than in the release position.

Further, the closing unit 5 comprises a spring 14 in the form of a tension spring, with which force is applied to the rotary latch 6 in the direction of the closed position. A restoring force K generated by the spring 14 and acting on the rotary latch 6 in the release position shown has no force component along a guiding section of the guide slot 11 shown in FIG. 2 that is associated with the release position of the rotary latch 6. In other words, the restoring force K acts on the rotary latch 6 in a direction normal to the longitudinal dimension (i.e., length) of the guiding section 17 of the guide slot 11.

The guide slot 11 is substantially L-shaped and has a closing section 15 running substantially parallel to the restoring force K, and which passes by a curve 16 of the guide slot 11 into the guiding section 17 of the guide slot 11 associated with the release position of the rotary latch 6.

In the release position shown in FIG. 1, the rotary latch 6 is arranged such that the guide pin 13 is arranged on the guiding section of the guide slot 11 associated with the release position of the rotary latch 6 and the guide pin 12 is arranged in the curve 16 of the guide slot 11. In this way, the rotary latch 6 is arranged in a rotary position in which the longer lever arm 8 lies in a movement path of the locking bolt 4, not shown, so that the locking bolt 4 comes into contact with the lever arm 8 as the closing movement of the movable body component continues and in this way forces the rotary latch 6 out from the release position.

FIG. 2 shows a schematic representation of the closing assembly 1 shown in FIG. 1 in a closed state. In FIG. 2 it can be seen that the guide slot 11 is substantially L-shaped and has the closing section 15 running substantially parallel to the restoring force, which passes by the curve 16 of the guide slot 11 into the guiding section 17 of the guide slot 11 associated with the release position of the rotary latch 6.

The rotary latch 6 is located on the straight guiding section 15 of the guide slot 11 and in a rotary position in which the lever arm 7 arrests the locking bolt 4 in the closed position shown. The spring 14 is also deflected enough in the closed state shown to generate a force by which the movable body component, not shown, can be held in the closed position.

Figure 3:
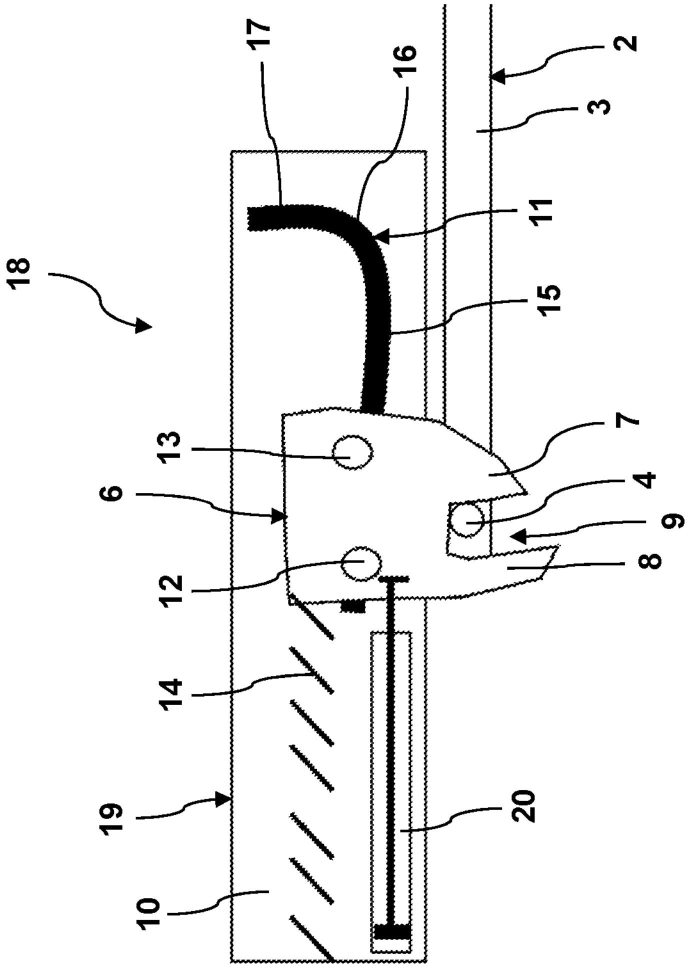
FIG. 3 is a schematic representation of another exemplary embodiment of a closing assembly according to the disclosure in a closed state.

FIG. 3 is a schematic representation of another exemplary embodiment of a closing assembly 18 according to the disclosure in a closed state. The closing unit 19 of the closing assembly 18 differs from the exemplary embodiment shown in FIGS. 1 and 2 in that the closing unit 19 has a fluid dynamic damping unit 20, connected to the rotary latch 6, which has a hydraulic or pneumatic design.

Figure 4:
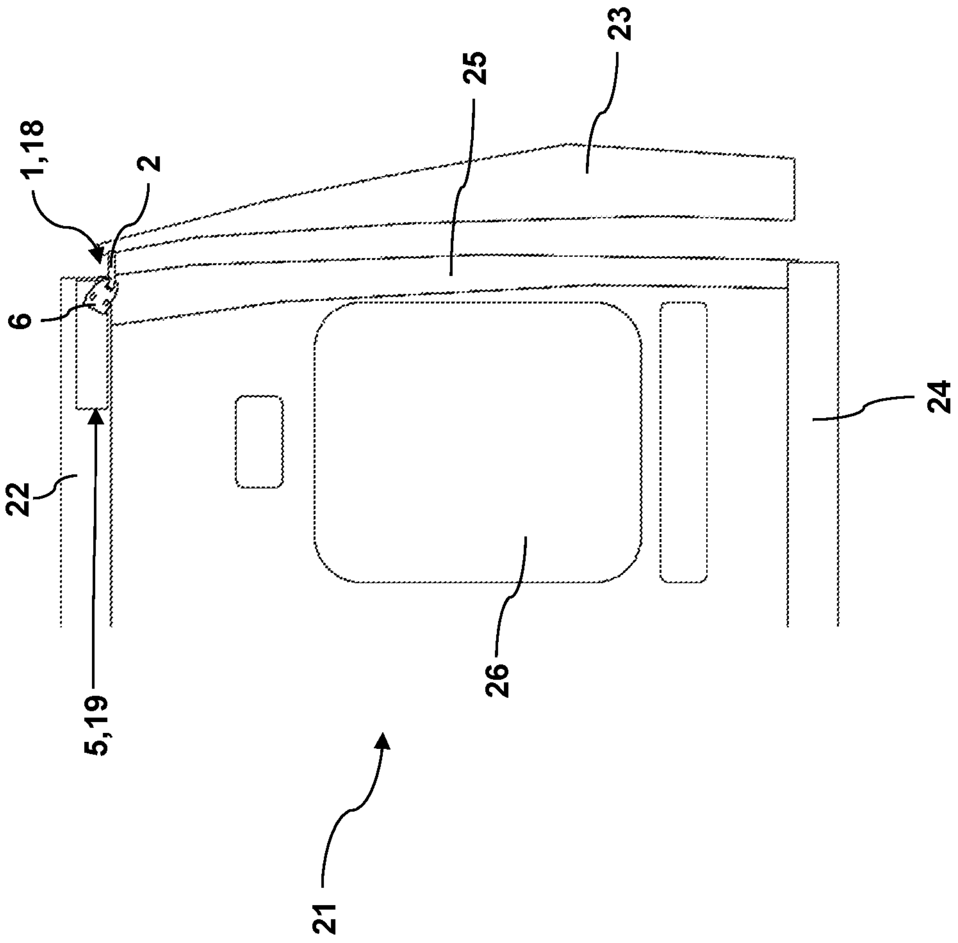
FIG. 4 is a schematic representation of an exemplary embodiment of a motor vehicle according to the disclosure.

FIG. 4 is a schematic representation of an exemplary embodiment of a motor vehicle 21 according to the disclosure having an immovable body component 22 in the form of a vehicle frame, such as an upper portion of the vehicle frame, and a movable body component 23 in the form of a body closure, which in this case is a vehicle door. Furthermore, the motor vehicle 21 comprises an immovable body component 24 in the form of a body floor component, a B pillar 25 connecting the body component 22 to the body component 24, and a vehicle seat 26.

The motor vehicle 21 comprises a closing assembly 1, 18 connected to the body components 22 and 23, which can be designed according to the exemplary embodiment shown in FIGS. 1 and 2 or the exemplary embodiment shown in FIG. 3. The closing unit 5, 19 of the closing assembly 1, 18 is fastened in the region of the B pillar 25 to the body component 22, which may be part of a frame of the vehicle.

Figure 5:
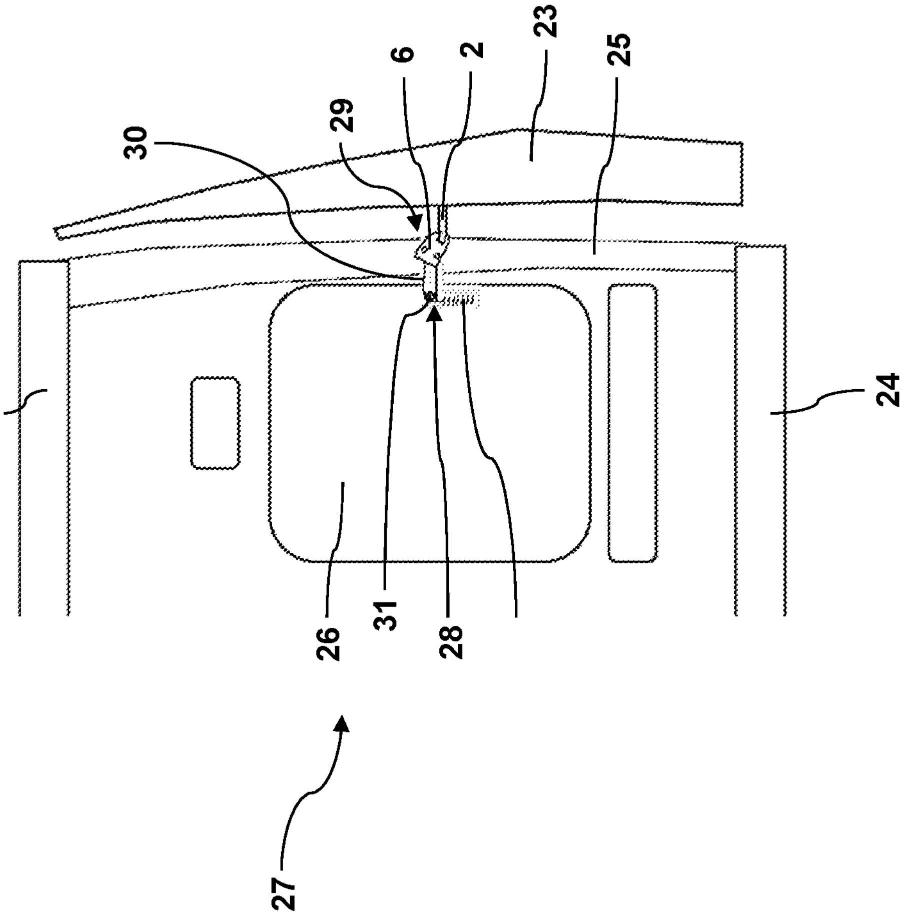
FIG. 5 is a schematic representation of another exemplary embodiment of a motor vehicle according to the disclosure.

FIG. 5 is a schematic representation of another exemplary embodiment of a motor vehicle 27 according to the disclosure. The motor vehicle 27 differs from the exemplary embodiment shown in FIG. 4 in that the closing unit 28 of the closing assembly 29 comprises a flexible traction component 30 by which the spring 14 is connected to the rotary latch 6, and a deflecting element 31 in the form of a deflection roller for deflecting the traction component 30. The deflecting element 31 deflects the traction component 30 by 90°. The spring 14 is arranged rotated and offset by 90° as compared to FIGS. 1 and 2. The closing assembly 29 can be integrated in a lock, associated with the movable body component 23 and not shown, or it may be arranged separately from the lock.

Figure 6:
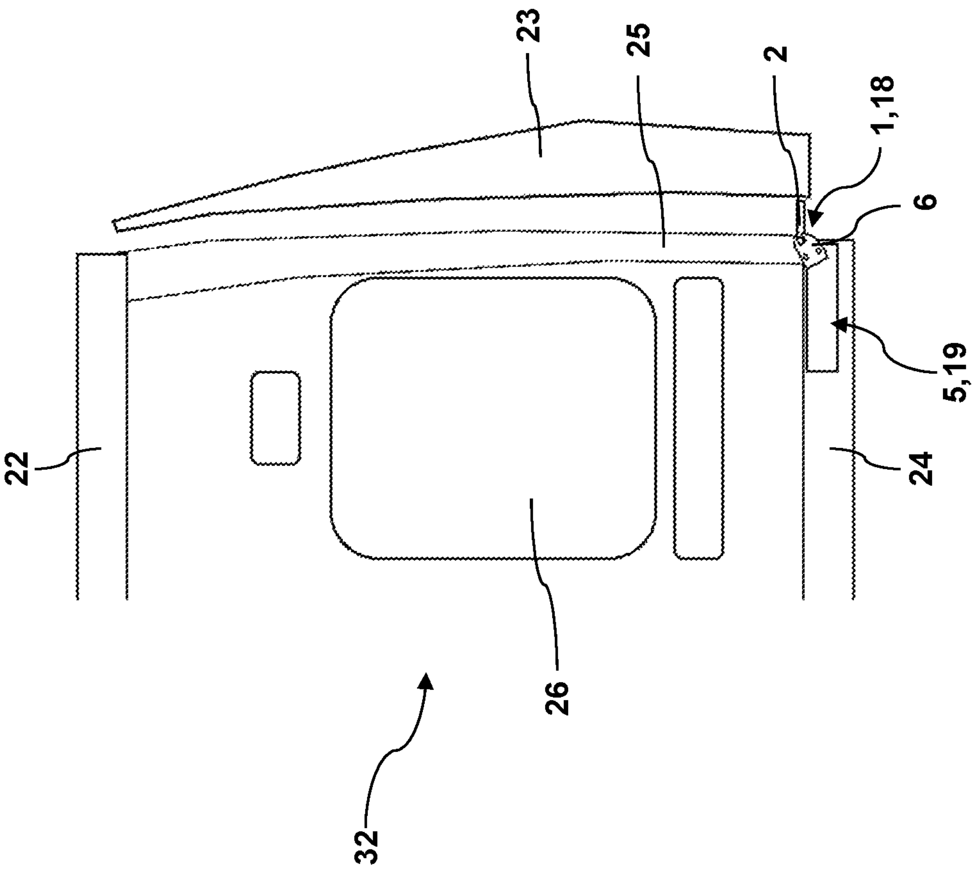
FIG. 6 is a schematic representation of another exemplary embodiment of a motor vehicle according to the disclosure.

FIG. 6 is a schematic representation of another exemplary embodiment of a motor vehicle 32 according to the disclosure. The motor vehicle 32 differs from the exemplary embodiment shown in FIG. 4 in that the closing unit 5, 19 of the closing assembly 1, 18 is fastened in the region of the B pillar 25 to the body component 24 in the form of a body floor component.

Figure 7:
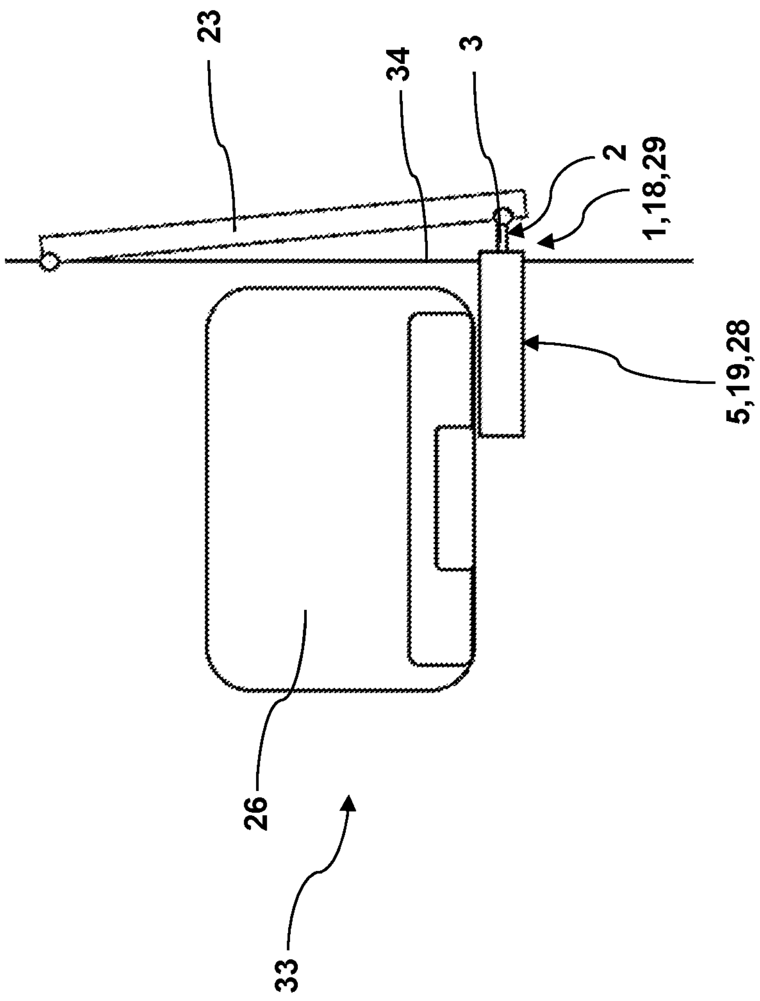
FIG. 7 is a schematic representation of another exemplary embodiment of a motor vehicle according to the disclosure in an opening state.

FIG. 7 is a schematic representation of another exemplary embodiment of a motor vehicle 33 according to the disclosure in an opening state, in which a movable body component 23 in the form of a vehicle door has been swiveled slightly out from its closed position, not shown, relative to an immovable body component 34.

The motor vehicle 33 differs from the exemplary embodiments shown in FIGS. 4 to 6 in that the closing element 2 comprises a support arm 3 hinged to the movable body component 23. A locking bolt is arranged at a free end section of the support arm 3, and the motor vehicle 33 comprises a swivel unit, not shown, for the automatic swiveling of the support arm 3 between the functional position shown in FIG. 7, standing out from the movable body component 23, to a resting position shown in FIG. 8, not standing out from the movable body component 23, and vice versa. In FIG. 7, the locking bolt is still connected to the closing latch, not shown.

Figure 8:
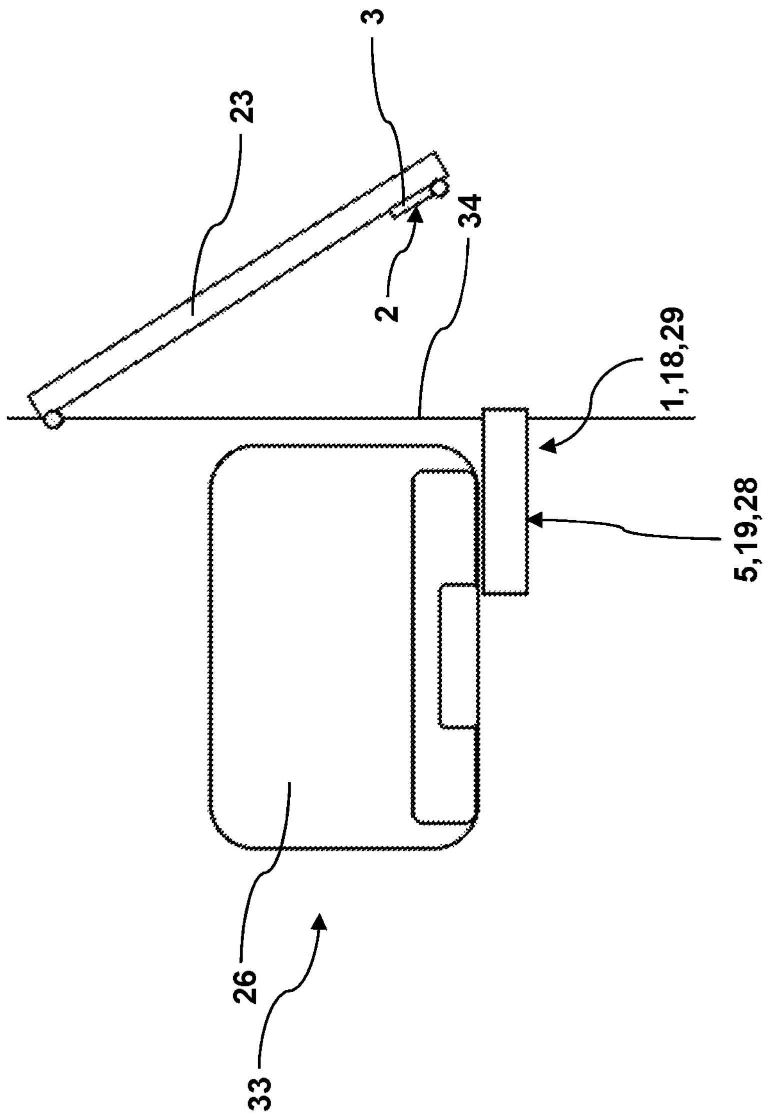
FIG. 8 is a schematic representation of the motor vehicle shown in FIG. 7 in another opening state.

FIG. 8 is a schematic representation of the motor vehicle 33 shown in FIG. 7 in another opening state, in which the movable body component 23 has been swiveled further as compared to FIG. 7. Furthermore, the support arm 3 has been swiveled into its resting position.

Directional terms such as "fore," "aft," "transverse," "longitudinal," "vertical," "front," "rear," "side," etc., are used herein with reference to the normal operational attitude of a motor vehicle. It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
an immovable body component;
a moveable body component configured to move relative to the immovable body component;
a closing assembly including a locking bolt configured to engage a latch moveable relative to a guide slot between a release position and a closed position, wherein the closing assembly includes a spring exerting a restoring force urging the latch in the direction of the closed position, wherein the restoring force has no force component along a section of the guide slot corresponding to the release position of the latch,
wherein the guide slot is substantially L-shaped and includes a closing section extending substantially parallel to the restoring force of the spring, a release section extending approximately normal to the restoring force of the spring, and a curved section connecting the closing section and the release section,
wherein the latch includes two guide pins configured to slide within the guide slot,
wherein the restoring force urges the latch to the closed position when at least one of the guide pins is in the closing section of the guide slot,
wherein the closing section has a straight configuration, and the curved section substantially follows an arc along an entirety of a length of the curved section, and
wherein, when the latch is in the release position, one of the guide pins is in the release section and the other of the guide pins is in a location within the curved section that substantially follows the arc.

2. The motor vehicle as recited in claim 1, wherein:
the closing assembly includes a closing unit including the latch, guide slot, and spring.

3. The motor vehicle as recited in claim 2, wherein the closing unit further includes at least one damping unit connected to the latch.

4. The motor vehicle recited in claim 3, wherein the at least one damping unit is configured to apply a variable damping force to the latch.

5. The motor vehicle as recited in claim 3, wherein the at least one damping unit is connected to the latch on a side of the guide slot opposite to the spring.

6. The motor vehicle as recited in claim 2, wherein:
the closing assembly includes a closing element including the locking bolt.

7. The motor vehicle as recited in claim 1, wherein the guide pins are spaced apart from one another and extend parallel to one another.

8. The motor vehicle as recited in claim 1, wherein the spring is a tension spring.

9. The motor vehicle as recited in claim 1, wherein:
the closing assembly includes a closing unit including the latch, guide slot, and spring, and
the closing unit is mounted to a B pillar of the motor vehicle.

10. The motor vehicle as recited in claim 1, wherein the closing assembly includes a closing element including the locking bolt and a support arm hinged to the moveable body component.

11. The motor vehicle as recited in claim 10, wherein the locking bolt is arranged adjacent a free end of the support arm.

12. The motor vehicle as recited in claim 11, further comprising at least one swivel unit configured to swivel the support arm between a functional position projecting out from the moveable body component to a resting position.

13. The motor vehicle as recited in claim 1, wherein the moveable body component is a body closure.

14. A motor vehicle, comprising:
an immovable body component;
a moveable body component configured to move relative to the immovable body component;
a closing assembly including a locking bolt configured to engage a latch moveable relative to a guide slot between a release position and a closed position, wherein the closing assembly includes a spring exerting a restoring force urging the latch in the direction of the closed position, wherein the restoring force has no force component along a section of the guide slot corresponding to the release position of the latch,
wherein the closing assembly includes a closing unit including the latch, guide slot, and spring,
wherein the closing unit is mounted to one of the moveable body component and the immovable body component,
wherein the closing assembly includes a closing element including the locking bolt,
wherein the closing element is mounted to the other of the moveable body component and the immovable body component,
wherein the guide slot is substantially L-shaped and includes a closing section extending substantially parallel to the restoring force of the spring, a release section extending approximately normal to the restoring force of the spring, and a curved section connecting the closing section and the release section,
wherein the latch includes two guide pins configured to slide within the guide slot,
wherein the restoring force urges the latch to the closed position when at least one of the guide pins is in the closing section of the guide slot,
wherein the guide pins are spaced-apart from one another and extend parallel to one another,
wherein the spring is a tension spring, and
wherein the closing section has a straight configuration, and the curved section substantially follows an arc along an entirety of a length of the curved section, and
wherein, when the latch is in the release position, one of the guide pins is in the release section and the other of the guide pins is in a location within the curved section that substantially follows the arc.

15. A closing assembly for a motor vehicle, comprising:
a guide slot;
a latch moveable relative to the guide slot between a release position and a closed position;
a locking bolt configured to engage the latch;
a spring exerting a restoring force urging the latch in the direction of the closed position, wherein the restoring force has no force component along a section of the guide slot corresponding to the release position of the latch,
wherein the guide slot is substantially L-shaped and includes a closing section extending substantially parallel to the restoring force of the spring, a release section extending approximately normal to the restoring force of the spring, and a curved section connecting the closing section and the release section,
wherein the latch includes two guide pins configured to slide within the guide slot,
wherein the restoring force urges the latch to the closed position when at least one of the guide pins is in the closing section of the guide slot, wherein the closing section has a straight configuration, and the curved section substantially follows an arc along an entirety of a length of the curved section, and wherein, when the latch is in the release position, one of the guide pins is in the release section and the other of the guide pins is in a location within the curved section that substantially follows the arc.

16. The closing assembly as recited in claim 15, wherein at least one damping unit is connected to the latch on a side of the guide slot opposite to the spring.

* * * * *